United States Patent
Sinn et al.

(10) Patent No.: US 10,459,427 B2
(45) Date of Patent: Oct. 29, 2019

(54) NUMERIC CONTROLLER WITH NOTIFICATION OF A CAM SYSTEM IN THE EVENT OF A CHANGE IN THE SUBROUTINE

(71) Applicant: SIEMENS AKTIENGESELLSCHAFT, München (DE)

(72) Inventors: Christof Sinn, Vaihingen (DE); Ralf Spielmann, Stuttgart (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 830 days.

(21) Appl. No.: 14/786,422

(22) PCT Filed: Aug. 27, 2013

(86) PCT No.: PCT/EP2013/067663
§ 371 (c)(1),
(2) Date: Oct. 22, 2015

(87) PCT Pub. No.: WO2014/173470
PCT Pub. Date: Oct. 30, 2014

(65) Prior Publication Data
US 2016/0098035 A1     Apr. 7, 2016

(30) Foreign Application Priority Data
Apr. 23, 2013   (EP) ..................... 13164874

(51) Int. Cl.
*G05B 19/4093*   (2006.01)

(52) U.S. Cl.
CPC .............. *G05B 19/40937* (2013.01); *G05B 2219/36061* (2013.01); *Y02P 90/265* (2015.11)

(58) Field of Classification Search
CPC .... G05B 19/40937; G05B 2219/36061; Y02P 90/265
See application file for complete search history.

(56) References Cited

U.S. PATENT DOCUMENTS 6,778,529 B1 *  8/2004  Field ..................... H04L 49/602
                                                                370/353
6,879,874 B2    4/2005  Sinn
(Continued)

FOREIGN PATENT DOCUMENTS

| CN | 101470430 A | 7/2009 |
| CN | 202159251 U | 3/2012 |

(Continued)

*Primary Examiner* — Kenneth M Lo
*Assistant Examiner* — Mohammad A Rahman
(74) *Attorney, Agent, or Firm* — Henry M. Feiereisen LLC

(57) ABSTRACT

A subroutine executable by the numeric controller to control a production machine is disclosed. A user selects at least one program instruction of the subroutine and the numeric controller outputs a parameterized description of the selected program instruction or of a sequence of program instructions that contains the selected program instruction to the user using the user interface. The user enters a change in the parameterized description and stores a modified subroutine that corresponds to the changed parameterized description. The numeric controller sends a message to a predetermined address identifying the original subroutine and the change made in a form that can be evaluated in automated fashion. The CAM system that generated the subroutine uses the message to independently and automatically ascertain a data record on which the original subroutine is based and to modify the data record accordingly.

11 Claims, 3 Drawing Sheets

(56) References Cited

U.S. PATENT DOCUMENTS

| | | | |
|---|---|---|---|
| 6,901,310 B2 | 5/2005 | Kobbelt et al. | |
| 6,956,567 B2 | 10/2005 | Sinn | |
| 6,961,056 B2 | 11/2005 | Sinn | |
| 7,149,668 B2 | 12/2006 | Schwanecke et al. | |
| 2002/0188667 A1* | 12/2002 | Kirnos | G06F 16/1787 709/203 |
| 2003/0023341 A1* | 1/2003 | Sagawa | G05B 19/4093 700/159 |
| 2004/0143362 A1 | 7/2004 | Mathews | |
| 2004/0193307 A1* | 9/2004 | Fujishima | G05B 19/4065 700/177 |
| 2005/0049741 A1* | 3/2005 | Dias | D04B 7/32 700/141 |
| 2005/0107078 A1* | 5/2005 | Imura | H04M 15/47 455/421 |
| 2012/0298230 A1* | 11/2012 | Jones | F04F 3/00 137/565.23 |
| 2013/0006396 A1* | 1/2013 | Kito | G05B 19/4093 700/83 |

FOREIGN PATENT DOCUMENTS

| | | |
|---|---|---|
| CN | 102645899 A | 8/2012 |
| EP | 0881034 A1 | 12/1998 |
| EP | 1296211 A1 | 3/2003 |
| EP | 2541355 A1 | 1/2013 |
| JP | H07261818 A | 10/1995 |
| JP | 2004145716 A | 5/2004 |

* cited by examiner

NUMERIC CONTROLLER WITH NOTIFICATION OF A CAM SYSTEM IN THE EVENT OF A CHANGE IN THE SUBROUTINE

CROSS-REFERENCES TO RELATED APPLICATIONS

This application is the U.S. National Stage of International Application No. PCT/EP2013/067663, filed Aug. 27, 2013, which designated the United States and has been published as International Publication No. WO 2014/173470 A1 and which claims the priority of European Patent Application, Serial No. 13164874.3, filed Apr. 23, 2013, pursuant to 35 U.S.C. 119(a)-(d).

BACKGROUND OF THE INVENTION

The present invention relates to an operating method for a numeric controller,
  wherein the numeric controller has access to a subroutine which can be executed by the numeric controller,
  wherein a production machine can be controlled by the numeric controller by execution of the subroutine,
  wherein a selection command is pre-specified to the numeric controller by an operator via an operator interface, by means of which selection command at least one program statement of the subroutine is selected,
  wherein the numeric controller outputs to the operator of the numeric controller a parameterized description of the at least one selected program statement or of a sequence of program statements containing the at least one selected program statement via the operator interface,
  wherein the numeric controller accepts a change in the parameterized description from the operator,
  wherein the numeric controller stores a modified subroutine corresponding to the changed parameterized description.

The present invention further relates to a computer program, wherein the computer program contains machine code which can be executed directly by a numeric controller, wherein the execution of the machine code by the numeric controller causes the numeric controller to execute such an operating method.

The present invention further relates to a numeric controller, in which is stored such a computer program which can be executed by the numeric controller.

Numeric controllers usually execute a so-called subroutine during operation. The subroutine defines the way in which position-controlled and speed-controlled axes of the production machine (in particular a machine tool) are controlled. It is theoretically possible to create the subroutine directly via the operator interface of the numeric controller. Via the operator interface, however, the numeric controller only has the option of setting individual control commands sequentially, one after the other. In practice, therefore, the subroutine is created by means of a CAM system using data created using a CAD system. The CAM system may comprise a so-called postprocessor.

When the subroutine is created, a series of sequences of program statements is created by an operator of the CAM system by means of the CAM system. For each sequence of program statements the operator of the CAM system pre-specifies a parameterized description of the respective processing to the CAM system. For example, when milling during mold construction the operator of the CAM system can pre-specify which tool is to be used for a finishing operation, how great a plunging depth is to be, what the reference geometry is, and so on. He can also pre-specify the path along which a milling tool is to be moved, for example. The CAM system then creates the subroutine on the basis of the parameterized descriptions of the sequences of program statements. The subroutine is transferred to the numeric controller. It usually no longer contains the parameterized descriptions as such, but only the sequence of individual control commands for the position-controlled and speed-controlled axes of the production machine. The sequence of individual control commands may be very long (sometimes several million data sets). The criteria which were used as the basis for determining the sequence of control commands may no longer be deduced from the sequence of control commands. Examples of such criteria are the line spacing, the tool geometry, the processing strategy, effects of collision avoidance calculations, technical parameters such as for example the tool setting, etc.

The operator of the CAM system is usually a different person from the operator of the numeric controller. In many cases the operator of the CAM system does not have the technical data of the production machine, which is to be controlled by means of the subroutine. As a result, the execution of the subroutine by the numeric controller may lead to work pieces that are not correctly produced. Depending on the individual case, in such an event it may be necessary to fundamentally redefine the subroutine. In many cases, however, it is apparent for the operator of the numeric control—on the basis of his knowledge of the production machine and its technical data—which parameter of which parameterized description needs to be changed, in order to be able to manufacture a proper work piece.

In the conventional prior art the operator of the numeric controller can only make changes to the subroutine if the part of the subroutine to be changed is present in parameterized form in the numeric controller. This is usually the case for only a small fraction of the entire subroutine. In all other cases the operator of the numeric controller in the conventional prior art contacts the operator of the CAM system and informs him which parameters he wishes to have changed and in which parameterized description. The operator of the CAM system thereupon calls up the CAM system, manually changes the corresponding parameterized description and then creates the subroutine again. The correspondingly modified subroutine is transferred to the numeric controller. Recently there have also been efforts to give the operator of the numeric controller the option whereby he can also modify those parts of the subroutine that were not present in parameterized form in the numeric controller from the start.

If the operator of the numeric controller changes the subroutine, this logically leads to an inconsistency between the subroutine created by the operator of the CAM system and the modified subroutine processed by the numeric controller. In order to reestablish consistency, in the prior art the operator of the CAM system must carry out the same changes that were made by the operator of the numeric controller. Updating changes in this way is prone to errors, cumbersome and time-consuming.

SUMMARY OF THE INVENTION

The object of the invention is to create options by means of which the subroutine stored in the CAM system can easily be kept consistent with the subroutine processed by the numeric controller.

According to one aspect of the invention, the object is achieved according to the invention by an operating method whereby the numeric controller, as well as storing the modified subroutine, compulsorily sends a message to a predetermined address, which message identifies at least the original subroutine and the change made in automatically evaluable form, so that the CAM system that has been used to create the subroutine is capable of using the message, autonomously and automatically to ascertain a data set underlying the original subroutine and to modify the data set in line with the change made. The term "compulsorily" implies that the sending of the message cannot be suppressed by the operator of the numeric controller.

Advantageous embodiments of the invention are also recited in the dependent claims.

However, it is not necessary or often even desirable for the CAM system to update its subroutine completely autonomously and automatically. Rather, a semiautomatic process is usually preferable, in which the corresponding messages are pre-specified to the CAM system by its operator, which messages are actually used by the CAM system as the basis for updating the subroutine present in the CAM system. The operator of the CAM system therefore preferably decides which messages are to be used as the basis for the update. However, the message must be designed in such a way that autonomous and automatic updating is possible.

The numeric controller preferably sends the message to the predetermined address, regardless of what change the operator has made.

The predetermined address to which the message is sent can be defined as required. The address is preferably characteristic for the CAM system by means of which the subroutine was created.

In addition to the information about the subroutine and about the change carried out, the message preferably contains, in automatically evaluable form, an identification of the numeric controller.

It is possible for the numeric controller, before sending the message, to give the operator of the numeric controller the opportunity to attach free text and/or files to the message. This often makes it easier for the operator of the CAM system, for example, to see why the operator of the numeric controller has made a corresponding change to the subroutine.

Furthermore, the message may be defined as required. For example, the message may be an e-mail.

For the inventive operating method to function correctly, it is necessary for the predetermined address to be known to the numeric controller. It is possible for the predetermined address to be permanently stored in the numeric controller. However, the numeric controller preferably determines the predetermined address autonomously based on a header of the subroutine.

According to another aspect of the invention, the object is achieved by a computer program containing machine code which can be executed directly by a numeric controller such that the execution of the machine code by the numeric controller causes the numeric controller to execute an inventive operating method as set forth above.

The According to yet another aspect of the invention, the object is achieved by a numeric controller in which is stored an inventive a computer program as set forth above which can be executed by the numeric controller.

BRIEF DESCRIPTION OF THE DRAWINGS

The characteristics, features and advantages of this invention as described above, and the way and means by which they are achieved, will be understood more clearly and precisely in connection with the following description of the exemplary embodiments, which are explained in greater detail in conjunction with the drawings. These show the following, in schematic form.

The typical procedure of the prior art on which the present invention is based is described first below, in conjunction with FIG. 1.

DETAILED DESCRIPTION OF PREFERRED EMBODIMENTS

Figure 1:
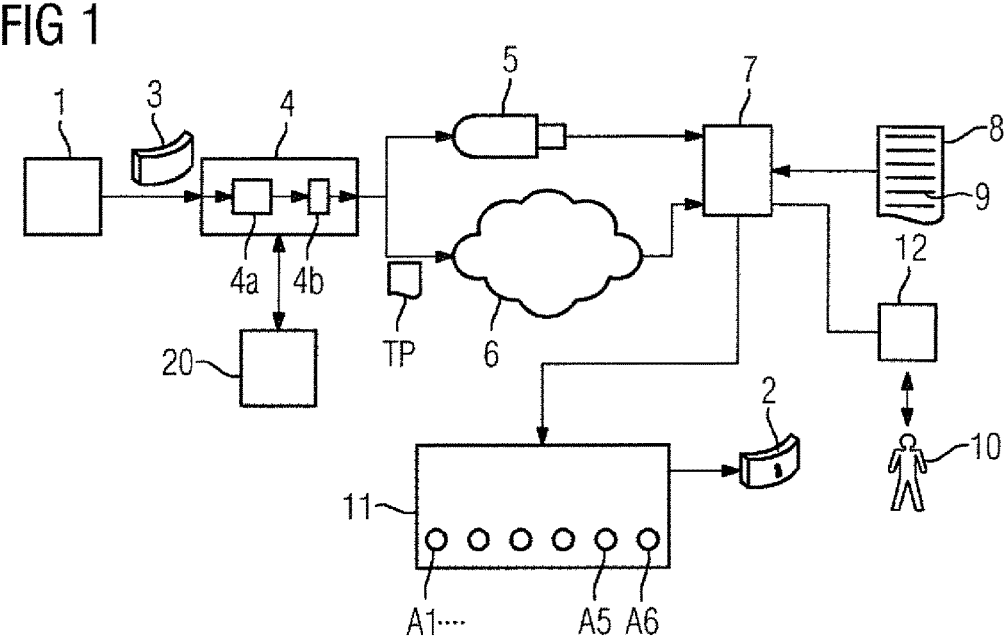
FIG. 1 a network of a plurality of devices,
FIG. 2 a main program of a subroutine,
FIG. 3 a subprogram of a subroutine,
FIG. 4 a communication from the network in FIG. 1,
FIG. 5 an output screen, and
FIG. 6 a message.

According to FIG. 1 a work piece 2 to be manufactured is first specified by means of a CAD system 1. A (purely geometric) description 3 of the work piece 2 is forwarded to a CAM system 4. The CAM system 4 usually comprises a CAM processor 4a and a postprocessor 4b. A subroutine TP is created by means of the CAM system 4. The CAM processor 4a is responsible for a process pattern. The CAM processor 4a normally generates a sequence of tool paths, on the basis of parameterizable masks which are assigned to surfaces of the work piece 2. The tool paths are usually defined control-independently. The postprocessor 4b converts the tool paths into a control-specific sequence (=the subroutine TP). The subroutine TP is for example transferred via a data carrier 5 or a computer-to-computer connection 6 to a numeric controller 7. The numeric controller 7 thus has access to the subroutine TP. The illustration of the data carrier 5 as a USB memory stick is purely exemplary. The computer-to-computer connection 6 can be embodied as a LAN, as a WAN or as WWW depending on the individual situation.

The numeric controller 7 is programmed with a computer program 8. The computer program 8 is stored internally in the numeric controller 7, for example in an EEPROM or in a Flash EPROM. The computer program 8 contains machine code 9, which is directly executable by the numeric controller 7. The computer program 8 is usually stored in the numeric controller 7 by the manufacturer of the numeric controller 7.

The execution of the machine code 9 by the numeric controller 7 first causes the numeric controller 7—after a corresponding control command is specified by an operator 10—to execute the subroutine TP. A production machine 11 is controlled by the numeric controller 7 by execution of the subroutine TP. The production machine 11 may in particular be designed as a tool machine, for example as a tool machine with one, two, three, four, five etc. position-controlled axes A1 to A5. The work piece 2 is produced by the execution of the subroutine TP (and the corresponding control of the production machine 11).

Figure 2:
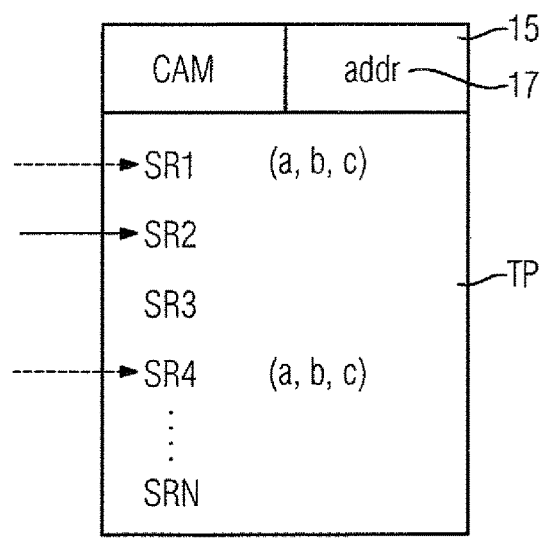

According to FIG. 2, a main program of the subroutine TP usually comprises subprogram calls SR1, SR2, . . . SRN. It may also consist exclusively of a sequence of subprogram calls SR1, SR2, . . . SRN.

Some of the subprogram calls SR1, SR2, . . . SRN the subprogram calls SR1 and SR4, according to FIG. 2 are parameterized. In such a case the associated subprogram is stored in the numeric controller 7 independently of the subroutine TP. By means of the associated subprogram, the corresponding subprogram call SR1, SR4 is converted within the numeric controller 7 into a sequence of individual travel movements of the position-controlled axes A1 to A5 of the production machine 11. The numeric controller 7 takes the parameters a, b, c of the corresponding subprogram call SR1 SR4 into account during the conversion into the travel movements of the position-controlled axes A1 to A5. These parts of the subroutine TP can therefore be pre-specified to the numeric controller 7 in parameterized form.

Figure 3:
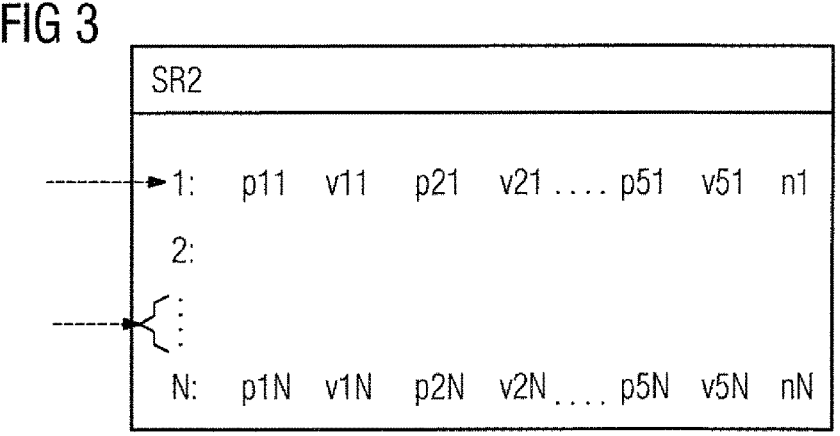

Other subprogram calls SR1, SR2, . . . SRN—the subprogram calls SR2 and SR3 according to FIG. 2—are not parameterized. In this case the associated subprograms are part of the subroutine TP. In accordance with FIG. 3 they are usually part of a (very long) sequence of individual travel movements of the position-controlled axes A1 to A5. For each individual travel movement, a respective position value p11 to p51, p1N to p5N is pre-specified for each position-controlled axis A1 to A5. Furthermore a respective velocity value v11 to v51, v1N to v5N is pre-specified mainly for each position-controlled axis A1 to A5. Furthermore, a speed n1 to nN is pre-specified mainly for at least one speed-controlled axis A6.

It is possible for the non-parameterized subprogram calls SR2, SR3 to be omitted as such, and instead the sequences of individual travel movements of the position-controlled axes A1 to A5 and possibly also of the speed-controlled axis A6 to be contained in the main program of the subroutine TP.

Beyond the execution of the subroutine TP, the computer program 8, with which the numeric controller 7 is programmed, makes it possible for the operator 10 to communicate with the numeric controller 7 via an operator interface 12 and the numeric controller 7 to execute actions on the basis thereof. The corresponding operating method, which forms the subject matter of the present invention, is explained in greater detail below in conjunction with FIG. 4.

Figure 4:
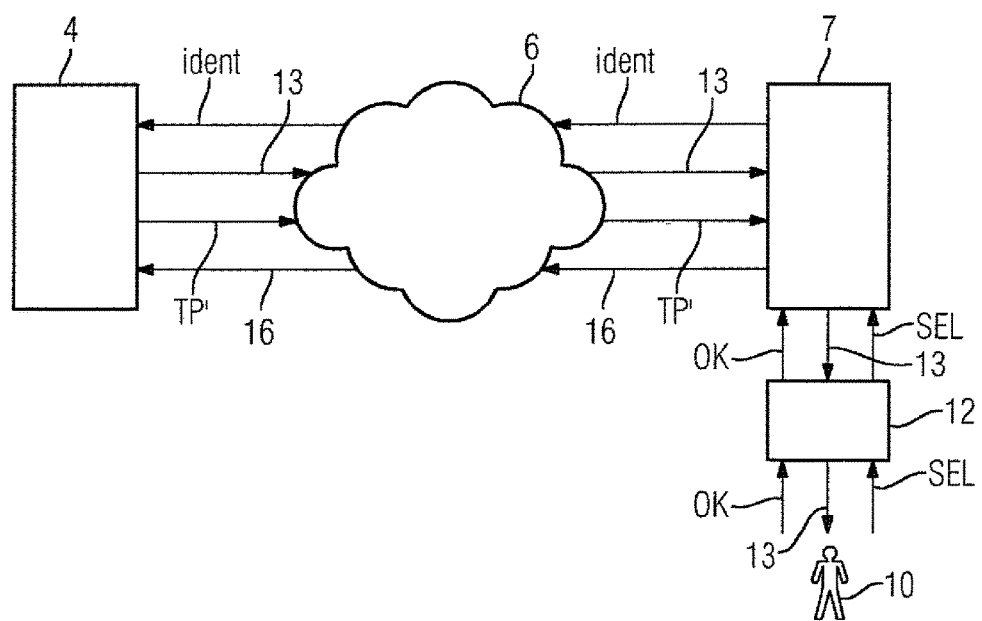

In accordance with FIG. 4, the operator 10 can pre-specify a selection command SEL to the numeric controller 7 via the operator interface 12. At least one program statement is selected from a sequence of program statements of the subroutine TP by means of the selection command SEL. For example, the operator 10 may—as indicated by dotted arrows in FIG. 2—select a subprogram call SR1, SR4, which is pre-specified to the numeric controller 7 in parameterized form, of which the associated subprogram is therefore stored in the numeric controller 7 independently of the subroutine TP. Alternately the operator 10 may—as indicated by dotted arrows in FIG. 3—select by means of the selection command SEL an individual program statement from a sequence of program statements or a group of successive program statements from the sequence of program statements. For example, the operator 10 in the last-named case may select the first and the last program statement from the group to be selected. The associated sequence of program statements is preferably not present in parameterized form either in the subroutine TP or in the numeric controller 7. As another alternative the operator 10 may—as indicated by a dotted arrow in FIG. 2—by means of the selection command SEL select a subprogram call SR2 which is not present in parameterized form either in the numeric controller 7 or in the subroutine TP. In this case the entire sequence of travel movements of the corresponding subprogram is selected by the selection command SEL (indirectly).

It is possible for the operating method explained in greater detail below only to be executed if the operator 10 selects certain program statements. For example, it is possible for the operating method explained in greater detail below only to be executed if the operator 10 selects program statements that are present in parameterized form in the numeric controller 7. However, the operating method explained in greater detail below is preferably always executed, and therefore regardless of what program statement or program statements the operator 10 selects. The operator 10 may therefore, as far as the inventive operating method is concerned, preferably select a random program statement or a random group of successive program statements from the sequence of program statements. In particular, the program statements selected by the operator 10 comprise at least one program statement, on the basis of which the work piece 2 is processed on a surface which is curved in two mutually orthogonal directions at at least one point on the surface. This applies regardless of how the two mutually orthogonal directions are selected. In other words, at the corresponding point on the surface there is no direction in which the surface is not curved.

Figure 5:
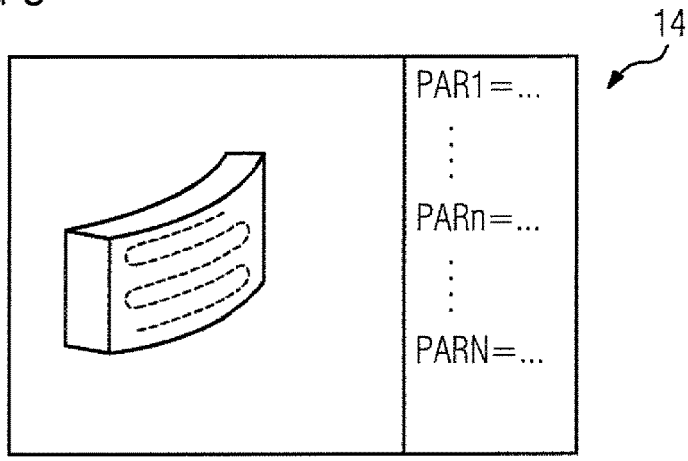

On the basis of the selection command SEL, the numeric controller 7 outputs a parameterized description 13 of the selected program statement or of the sequence of program statements that contains at least one selected program statement via the operator interface 12 to the operator 10 of the numeric controller 7. FIG. 5 shows a corresponding output screen 14, purely by way of example.

In the event that the inventive operating method is executed even if the parameterized description 13 is not contained in the numeric controller 7 and in the subroutine TP, the numeric controller 7 must know which CAM system 4 was used to create the subroutine TP. The corresponding information can be pre-specified to the numeric controller 7, for example by the operator 10. The corresponding information can also be permanently stored in the numeric controller 7. However, in accordance with FIG. 2 the subroutine TP preferably contains a header 15, in which the corresponding information is stored. In this case the numeric controller 7 can determine the associated CAM system 4 autonomously on the basis of the header 15. The information as such may be of any kind. For example, it can be stored in the form of a URL (universal resource locator).

If the operator 10 of the numeric controller selects a program statement that is not present in parameterized form in the subroutine TP and in the numeric controller 7, in accordance with FIG. 4 the numeric controller 7 directly or indirectly transmits a piece of information ident via the computer-to-computer connection to the CAM system 4, which was used to create the subroutine TP. The identification ident identifies the at least one selected program statement. For example, the corresponding information ident may comprise the line number of the main program of the subroutine TP or an identifying marker of the corresponding subprogram and the line number there. The information ident is automatically processed by the CAM system 4. In particular, the CAM system 4 identifies the associated parameterized description 13 of the selected program statement or the sequence of program statements containing the at least one selected program statement. The parameterized description 13 is transmitted by the CAM system 4 via the computer-to-computer connection 6 to the numeric controller 7. The numeric controller 7 receives the parameterized description 13 and outputs it to the operator 10.

Regardless of whether the parameterized description 13 is present in the numeric controller 7 or in the subroutine TP, or whether the parameterized description 13 is transmitted to the numeric controller 7 by the CAM system 4, the parameterized description 13 contains a number of parameters PAR1 to PARN. The parameters PAR1 to PARN can be changed by the operator 10. If the operator 10 now changes one of the parameters PAR1 to PARN, for example the parameter PARn, a modified subroutine TP' is created.

If the parameterized description 13 of the selected program statement(s) is stored in the numeric controller 7, the numeric controller 7 is able itself to identify the modified subroutine TP'. Therefore, no previous communication between the numeric controller 7 and the CAM system 4 is necessary. It is certainly possible, but not necessary, On the other hand, if the parameterized description 13 is not stored in the numeric controller 7, the numeric controller 7 transmits (after entry of a corresponding command by the operator 10) the changed parameter PARn (or all parameters PAR1 to PARN including the changed parameter PARn) via the computer-to-computer connection 6 to the CAM system 4. The CAM system 4 thereupon identifies the modified subroutine TP'. The modified subroutine TP' corresponds to the parameterized description 13 changed by the operator 10. The modified subroutine TP' is automatically transmitted to the numeric controller 7 by the CAM system 4, where-required. The numeric controller 7 receives the modified subroutine TP'. The operator 10 is thus, thereafter able to call the modified subroutine IF instead of the original subroutine TP, and have it executed by the numeric controller 7.

Regardless of whether the modified subroutine TP' was created with or without communication of the numeric controller 7 with the CAM system 4, the modified subroutine TP' is now available in the numeric controller 7. It is therefore possible that the operator 10 of the numeric controller 7—for example after a test production of one or more work pieces 2—will find the modified subroutine TP' to be in order. In this case the operator 10 of the numeric controller 7 outputs a confirmation OK to the numeric controller 7. On the basis of the confirmation OK the numeric controller 7 stores the modified subroutine TP' " corresponding to the changed parameterized description 13 internally. Furthermore, the numeric controller 7 compulsorily—immediately or with a delay—sends a message 16 to a predetermined address 17 together with the stored version of the modified subroutine TR.

Figure 6:
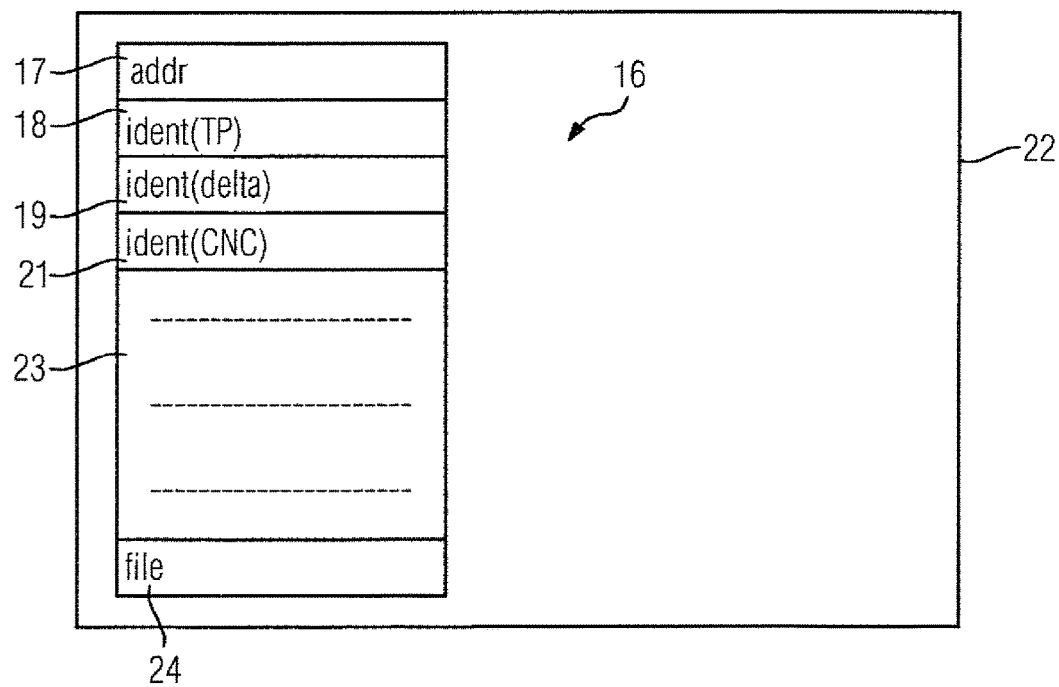

According to FIG. 6, the message 16 contains a unique identification 18 in a predefined format for the original subroutine TP. The message 16 furthermore contains, in a predefined format, a unique identification 19 for the change made by the operator 10 of the numeric controller 7. The For this reason, because the identifications 18, 19, uniquely identify the original subroutine TP and the change made, they are automatically evaluated. It is therefore possible in principle for the CAM system 4 which was used to create the (original) subroutine TP, on the basis of the message 16—particularly on the basis of the identification 18—autonomously and automatically to ascertain a data set 20, which forms the basis for the original subroutine TP. Furthermore, on the basis of the message 16 the CAM system 4 is able to modify the data set 20 according to the change made described by the identification 19. The message 16 preferably further contains an identification 21 of the numeric controller 7 in automatically evaluable form.

As already mentioned, it is possible for the numeric controller 7 not to send the message 16 immediately upon storage of the modified subroutine TP'. The computer program 8, with which the numeric controller 7 is programmed, is however designed in such a way that the message 16 is sent compulsorily. For example, ogee after the confirmation OK decision, execution of the modified subroutine TP can be blocked until the message 16 is sent.

If the message 16 is sent with a delay, the numeric controller 7 may for example open a window 22 on a screen of the operator interface 12, via which the operator 10 of the numeric controller 7 can input free text 23. Alternately or additionally, it is possible for the operator 10 of the numeric controller 7 to attach a file 24 (or possibly even several files 24) to the message 16. The free text 23 and the file 24 (or files 24) in this case are sent together with the message 16 to the predetermined address 17.

It is possible for the numeric controller 7 only to send the message 16 if the operator 10 has made certain changes to the subroutine TP. For example, it is possible for the numeric controller 7 only to send the message 16 if the parameterized description 13 is present in the numeric controller 7 or in the subroutine TP. This is because in this case it is sometimes possible for the change to be made by the operator 10, without communication with the CAM system 4 being necessary. If, on the other hand the parameterized description 13 is transmitted by the CAM system 4 to the numeric controller 7, the CAM system 4 is aware that the subroutine TP was changed, and whish what change was made. In this case it may be possible, for example, for a corresponding message to be generated directly by the CAM system 4. However, the numeric controller 7 preferably sends the message 16 to the predetermined address 17 regardless of what change the operator 10 has made.

The predetermined address 17 must be known to the numeric controller 7. It may—analogous to the information about the CAM system 4—be permanently stored in the numeric controller 7. However, the predetermined address 17 is preferably stored in the header 15. In this case the numeric controller 7 can identify the predetermined address 17 autonomously the with the aid of the header 15.

The predetermined address 17 may as such be a random address. For example, it may be stored in the form of a URL or an e-mail address. In the last-named case the message 16 is an e-mail. Regardless of the type of predetermined address 17, the predetermined address 17 may for example be characteristic for the CAM system 4 which was used to create the subroutine TP. Alternately it may for example be an e-mail address of a predetermined operator of the CAM system.

The present invention has many advantages. In particular, it is possible for the operator of the CAM system 4 easily to keep the subroutine TP he has created consistent with the subroutine TP accessible to the numeric controller 7, even though the operator 10 of the numeric controller 7 has made changes to his subroutine TP. For example, the operator of the CAM system 4 may be automatically shown a corresponding message 16 or (for example in the case of an e-mail) may call it up in his e-mail inbox. If he wishes to accept the change, he merely has to authorize or release the change, which can be done by means of a simple confirmation command. The further updating of the data set 20 stored in the CAM system 4 and of the corresponding subroutine TP can take place automatically.

Even though the invention is illustrated and described in detail by the preferred exemplary embodiment, the invention is not limited by the disclosed examples and other variations may be derived herefrom by a person skilled in the art, without departing from the scope of protection of the invention.

The invention claimed is:

1. A method for operating a numeric controller using a subroutine executable by the numeric controller and generated by a CAM processor, said subroutine being configured to control a production machine and including subprogram calls which may be calls to subprograms having program statements that are stored as part of the subroutine or may be parameterized calls to subprograms having program statements that are stored independent of the subroutine, said method comprising the steps of:
  loading the subroutine into memory accessible to the numeric controller;
  entering a command into the numerical controller that selects at least one program statement of the subroutine using an operator interface;
  outputting a parameterized description of said selected program statement or of a sequence of program statements containing said selected program statement to the operator of the numeric controller using an operator interface;
  inputting a change in the parameterized description to the numerical control unit using an operator interface;
  storing a modified subroutine corresponding to the changed parameterized description in the numeric controller;
  compulsorily sending a message that identifies the original subroutine and the change made therein to a predetermined address so that the CAM system that was used to create the subroutine can autonomously and automatically use the message to ascertain a data set underlying the original subroutine and to selectively modify the data set in accordance with the change that was made in the parameterized description as well as storing the modified subroutine in response to an update authorization decision provided by a CAM operator, the message that identifies the original subroutine and the change made in the parameterized description being in a form that is automatically evaluable.

2. The method of claim 1, wherein the message from the numeric controller to the predetermined address is sent regardless of what change the operator has made.

3. The method of claim 1, wherein the predetermined address is characteristic of the CAM system that was used to create the subroutine.

4. The method of claim 1, wherein the message contains an identification of the numeric controller in automatically-evaluable form.

5. The method of claim 1, wherein the numeric controller gives the operator of the numeric controller an opportunity to attach free text and/or files to the message, before sending the message.

6. The method of claim 1, wherein the message is an e-mail.

7. The method of claim 1, wherein the numeric controller autonomously determines the predetermined address using a header of the subroutine.

8. A computer program, wherein the computer program is fixed in machine-readable program code on a machine-readable medium and configured for execution by a numerical controller to control a production machine using a subroutine generated by a CAM system, said subroutine including subprogram calls which may be calls to subprograms that are stored as part of the subroutine or parameterized calls to subprograms that are stored independent of the subroutine, the computer program comprising:
  program code configured to enter a command into the numerical controller that selects at least one program statement of the subroutine using an operator interface;
  program code configured to output a parameterized description of said selected program statement or of a sequence of program statements containing said selected program statement to the operator of the numeric controller using the operator interface;
  program code configured to input a change in said parameterized description to the numerical controller using an operator interface;
  program code configured to store a modified subroutine corresponding to said changed parameterized description in the numeric controller; and
  program code configured to compulsorily send a message that identifies the original subroutine and the change made in the original subroutine by said changed parameterized description in a form that is automatically evaluable to a predetermined address, so that the CAM system that was used to create the subroutine autonomously and automatically uses the message to ascertain a data set underlying the original subroutine and to selectively modify the data set underlying the original subroutine in accordance with the change that was made in the original subroutine by said changed parameterized description as well as storing the modified subroutine in response to an update authorization decision provided by a CAM operator, the message that identifies the original subroutine and the change made in the parameterized description being in a form that is automatically evaluable.

9. A numeric controller, comprising:
an operator interface; and
a computer program stored in the numerical control unit, the computer program including a sub-program executable by the numerical controller to control a production machine using a subroutine generated by a CAM system, said subroutine including subprogram calls which may be calls to subprograms that are stored as part of the subroutine or parameterized calls to subprograms that are stored independent of the subroutine, the sub-program including:
  program code configured to enter a command into the numerical controller that selects at least one program statement of the subroutine using an operator interface;
  program code configured to output a parameterized description of said selected program statement or of a sequence of program statements containing said selected program statement to the operator of the numeric controller using the operator interface;
  program code configured to input a change in the parameterized description to the numerical control unit using an operator interface;
  program code configured to store a modified subroutine corresponding to the changed parameterized description in the numeric controller;
  program code configured to compulsorily send a message that identifies the original subroutine and the change made in a form that is automatically evaluable to a predetermined address, so that the CAM system that was used to create the subroutine autonomously and automatically uses the message to ascertain a data set underlying the original subroutine and to selectively modify the data set in accordance with the change that was made as well as storing the modified subroutine in response to an update authorization decision provided by a CAM operator, the message that identifies the original subroutine and the change made therein being in a form that is automatically evaluable.

10. The computer program of claim 8 further comprising program code configured to load a subroutine executable by the numeric controller into memory accessible to the numeric controller.

11. The numeric controller of claim 9, the computer program therein further comprising program code configured to load a subroutine executable by the numeric controller into memory accessible to the numeric controller.

* * * * *